(12) United States Patent
Azzam

(10) Patent No.: US 8,820,394 B2
(45) Date of Patent: Sep. 2, 2014

(54) CONVECTION ENHANCED CLOSED LOOP GEOTHERMAL HEAT PUMP WELL

(75) Inventor: Dean H. Azzam, Hartford, CT (US)

(73) Assignee: Aztech Engineers, Inc., Hartford, CT (US)

( * ) Notice: Subject to any disclaimer, the term of this patent is extended or adjusted under 35 U.S.C. 154(b) by 1005 days.

(21) Appl. No.: 12/824,711

(22) Filed: Jun. 28, 2010

(65) Prior Publication Data

US 2010/0326623 A1    Dec. 30, 2010

Related U.S. Application Data

(60) Provisional application No. 61/220,640, filed on Jun. 26, 2009.

(51) Int. Cl.
| | |
|---|---|
| *F24J 3/08* | (2006.01) |
| *F25B 5/00* | (2006.01) |
| *F25B 13/00* | (2006.01) |
| *F25D 23/12* | (2006.01) |
| *F01K 27/00* | (2006.01) |
| *F03G 7/00* | (2006.01) |

(52) U.S. Cl.
CPC ... *F24J 3/08* (2013.01); *Y02E 10/16* (2013.01)
USPC ............... 165/45; 62/200; 62/324.1; 62/260; 60/641.1; 60/641.2; 60/641.3

(58) Field of Classification Search
USPC ........................... 165/45; 62/324.1, 200, 260; 60/641.1–641.3
See application file for complete search history.

(56) References Cited

U.S. PATENT DOCUMENTS

| | | | | |
|---|---|---|---|---|
| 2,847,767 | A | * | 8/1958 | Carrier, Jr. ...................... 34/164 |
| 2,914,124 | A | * | 11/1959 | Ripley, Jr. ........................ 166/57 |
| 3,286,771 | A | | 11/1966 | Sisson |
| 3,777,502 | A | * | 12/1973 | Michie et al. .................. 62/50.7 |
| 3,811,540 | A | * | 5/1974 | Knapp et al. .............. 188/196 D |
| 3,908,763 | A | * | 9/1975 | Chapman ....................... 166/302 |
| 3,939,659 | A | * | 2/1976 | Matthews ..................... 60/641.4 |
| 4,492,083 | A | * | 1/1985 | McCabe et al. .............. 60/641.5 |
| 4,574,875 | A | * | 3/1986 | Rawlings et al. ............... 165/45 |
| 4,741,389 | A | | 5/1988 | Smith |
| 4,790,375 | A | * | 12/1988 | Bridges et al. .................. 166/60 |
| 4,878,540 | A | * | 11/1989 | Raymond ...................... 166/369 |
| 5,024,553 | A | * | 6/1991 | Katsuragi ........................ 404/71 |
| 5,183,100 | A | * | 2/1993 | Harrell, Jr. ...................... 165/45 |
| 5,738,164 | A | * | 4/1998 | Hildebrand ..................... 165/45 |

(Continued)

OTHER PUBLICATIONS

International Search Report from Patent Cooperation Treaty dated Nov. 9, 2011 regarding PCT/US2011/001143.

*Primary Examiner* — Brandon M Rosati
*Assistant Examiner* — Claire Rojohn, III
(74) *Attorney, Agent, or Firm* — McCormick, Paulding & Huber LLP

(57) ABSTRACT

An energy transfer system for transferring energy between the earth and a facility comprising a well bore at least partially filled with groundwater, a center pipe having a top end and a bottom end disposed in the well bore and having a plurality of apertures for allowing the ingress and egress of groundwater, a pump disposed within the center pipe for facilitating a flow of groundwater through the apertures, and a closed source loop disposed in the well bore, the source loop including at least one source loop pipe extending adjacent the center pipe in said well bore and containing a working fluid for absorbing or transmitting thermal energy.

12 Claims, 4 Drawing Sheets

(56) References Cited

U.S. PATENT DOCUMENTS

| | | | |
|---|---|---|---|
| 6,142,215 A * | 11/2000 | Paulsen et al. | 165/45 |
| 6,925,830 B2 | 8/2005 | Xu | |
| 7,017,650 B2 | 3/2006 | Johnson, Jr. et al. | |
| 7,118,307 B2 * | 10/2006 | Stoecker et al. | 405/50 |
| 7,597,138 B1 | 10/2009 | Koenig | |
| 2006/0101820 A1 | 5/2006 | Koenig et al. | |

* cited by examiner

CONVECTION ENHANCED CLOSED LOOP GEOTHERMAL HEAT PUMP WELL

CROSS-REFERENCE TO RELATED APPLICATIONS

This application claims the benefit of U.S. Provisional Application Ser. No. 61/220,640, filed on Jun. 26, 2009, which is herein incorporated by reference in its entirety.

FIELD OF THE INVENTION

The present invention relates generally to a geothermal heat pump and well and more specifically to a geothermal heat pump well that combines the efficiency benefits of an open loop heat pump with the ease, stability and predictability of a closed loop heat pump.

BACKGROUND OF THE INVENTION

Heat pumps and/or air conditioners essentially move thermal energy from one location to another, i.e., from a heat source to a heat sink. A heat pump varies from an air conditioner in that it can reverse the direction of thermal transfer, changing the source to the sink, and the sink to the source, thus being able to provide cooling in the summer and heating in the winter. The vapor compression refrigeration cycle, which is currently used for most cooling and heat pump systems and equipment, uses a circulating refrigerant as the medium which moves the heat through evaporation (heat absorption) and condensation (heat rejection), i.e., it absorbs and removes heat from a space to be cooled and subsequently rejects that heat elsewhere. The evaporation and condensation of the refrigerant typically takes place in two different heat exchangers called the evaporator and condenser, respectively. In a heat pump, the evaporator is switched to be a condenser and vice versa depending on whether cooling or heating is required. The efficiency of such a system, defined as the power input for the prime mover versus thermal energy transfer, is highly dependent on the temperature difference between the heat source and heat sink. This temperature difference between the heat source and the heat sink is referred to as "lift." The greater the lift the lesser the efficiency of the system.

Geothermal, or ground source, heat pumps use the earth as a heat source/sink to improve the efficiency of the vapor compression refrigeration cycle by reducing the lift over conventional systems. The ground is a constant temperature of approximately 55° F. to 65° F. year round (depending on location). Typical heat pumps (air-to-air) use the outside air as the heat source/sink. Thus during the summer such air-to-air heat pumps attempt to reject heat to an approximate 91° F. sink and during the winter are attempting to absorb heat from a 0° F. heat source (temperatures dependant on location). Accordingly, the gained efficiency of having a 55° F. to 65° F. ground heat source/sink is apparent.

There are two basic types of known geothermal heat pumps, with some variations. A ground water heat pump, which is referred to as an open loop system, pumps water up from the ground and routes it to the heat pump condenser/evaporator and then either returns it to the ground in an injection well or runs it to surface water (storm). Alternatively, a ground-coupled heat pump, referred to as a closed loop system, uses a closed piping loop buried in the ground that moves the heat to and from the ground through a heat exchange process.

For both open and closed loop systems, a fluid, generally water for an open loop system and typically a water glycol mixture for the closed loop system, is piped directly to the one of the two heat exchangers in the heat pump. The heat exchanger's function alternates with the season, between being a condenser in the summer and being an evaporator in the winter.

A notable variation on open and closed loop systems is a standing column well. A standing column well is basically an open loop system that returns the water from the heat pumps to the same well that it is pumped out of. If the well(s) cannot keep up with system demand and maintain water well water supply temperature, then some of the water is diverted to surface (storm) water and not returned to the well(s). This is often referred to as "bleed," and causes the well to bring the same amount of water out of the ground that is bled to storm. This water is at ground water temperature and will increase the wells capacity in times of high demand.

There are problems, however, associated with these known systems. In particular, although the open loop can be very effective and efficient, an adequate ground water yield (the amount of water that can be taken out of the ground on a sustained basis) is required, re-injection of the water into the earth is very difficult, stringent environmental permitting is often required, adding years and thousands of dollars to a project, and the effect on the local ground water is a concern. Indeed, consider that water is brought from deep below the earth's surface, run through several hundred feet of piping and mechanical equipment and then re-injected back deep into the earth, and it is understandable that various environmental agencies insist on oversight. Moreover, open loop systems often require that a test well be drilled to evaluate the yield capacity of the well before proceeding with the construction and implementation of the system.

While closed loop systems do not rely on ground water, do not have the same environmental concerns as open loops systems, do not require re-injection, and are more widely used with more reliable and expectable performance, they are also notably less efficient. Indeed, closed loop heat exchange with the earth is not efficient because it relies only on conduction with a limited radius in which to transfer heat into or from the ground.

As a hybrid of open and closed loop systems, known standing column wells have not achieved their goal of providing the benefits of both open and closed loop systems without the associated drawbacks. As will be readily appreciated, standing column wells are essentially open loop systems and, as such, still invoke all of the environmental considerations and issues that are applicable to open loop systems. In particular, these wells are generally very deep and, as such, can be difficult to drill. Although substantial yield is not supposed to be required, some yield for water bleed-off will be necessary if the system cannot keep up. As noted above, the water being bleed off to storm is not re-injected into the ground and, accordingly, can take about two years to make-up. As such, this type of standing column well may not be code compliant in some jurisdictions. Moreover, if adequate yield cannot be obtained because of water flow restrictions in the well, the water temperature may fall below freezing, potentially resulting in disastrous freeze-ups. As will be readily appreciated, a thermal fluid cannot be used because to protect the system from such freeze-ups because of the open loop nature of the system.

With the foregoing problems and concerns in mind, it is a general object of the present invention to provide a heat pump that combines the efficiency benefits of an open loop systems with the ease, stability and predictability of closed loop systems.

SUMMARY OF THE INVENTION

It is an object of the present invention to provide a new well configuration that will improve the performance of a geothermal, or ground source, heat pump.

It is an additional object of the present invention to provide a geothermal heat pump that combines the efficiency benefits of open loop systems with the ease, stability and predictability of closed loop systems.

It is yet another object of the present invention to provide a geothermal heat pump that combines the efficiency benefits of the open loop systems with the ease, stability and predictability of the closed loop systems by adding convection, as well as conduction, to the heat exchange process.

It is yet another object of the present invention to provide a ground source heat pump system that provides cooling to a facility in the summer and heat to a facility in the winter.

These and other objects, features and advantages of the present invention will become apparent in light of the detailed description of the best mode embodiment thereof, as illustrated in the accompanying drawings.

DETAILED DESCRIPTION OF THE PREFERRED EMBODIMENT

Figure 1:
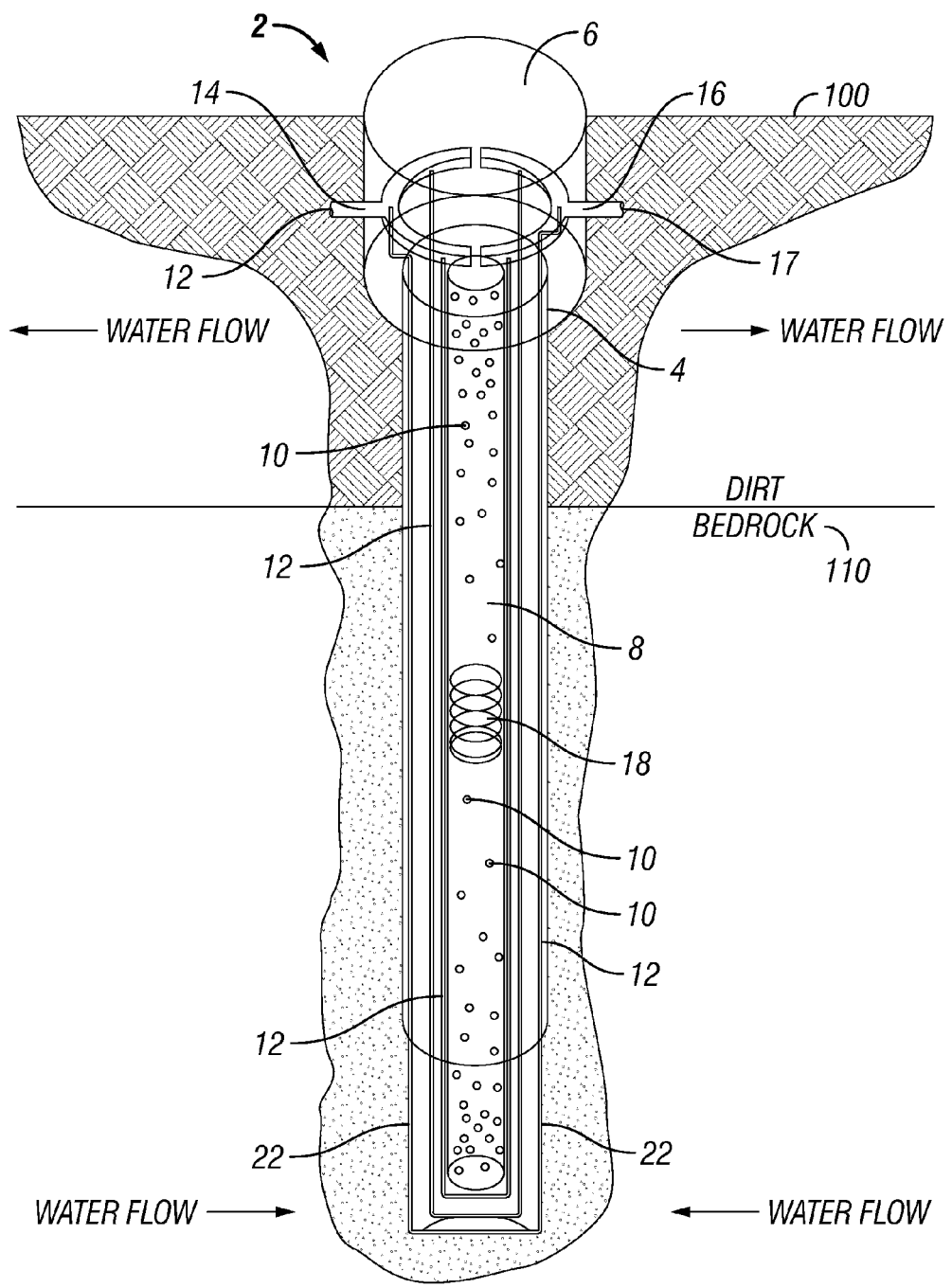
FIG. 1 is a schematic diagram of a geothermal heat pump well according to an embodiment of the present invention.
Figure 2:
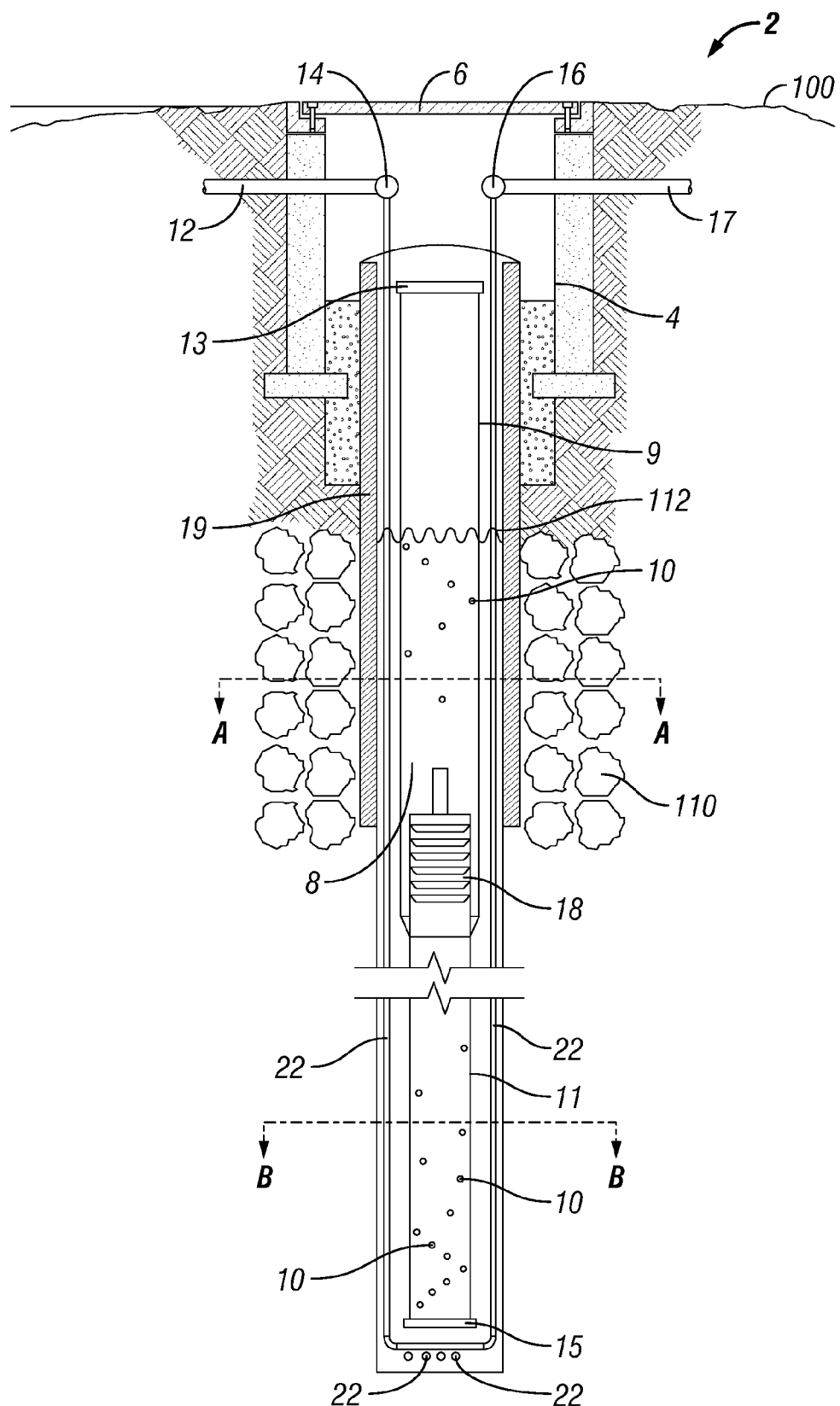
FIG. 2 is a schematic side elevational view of the geothermal heat pump well of FIG. 1 according to one embodiment of the present invention.

Referring to FIGS. 1 and 2, a well 2 for serving a geothermal, or ground source, heat pump system according to the present invention, is shown. As shown therein, the well 2 extends substantially vertically down from the surface of the earth into bedrock 110. A manhole 4 with a cover 6 sits on top of the well at grade level 100. As also indicated in FIG. 2, a standard concrete manhole and cast iron cover can also be used to top the well. In the northeastern part of the United States, bedrock is typically expected to start at a depth of 20-50 feet below the earth's surface, with dirt comprising the upper-most layer. Accordingly, to accommodate the well 2 of the present invention, a well hole is bored approximately 450 ft. into the earth, however, other optimum depths are also possible and are dependent on bedrock depth, water level, etc. For the well construction itself, a steel casing 19 is used only where the well extends through the uppermost layer of dirt. The steel casing 19 and bedrock 100 will form the outer containment wall of the well 2. A pipe 8 made of PVC, or other similar material known in the art, extends into the well 2 from near the top of the well to substantially close to the bottom of the well bore. As shown in FIGS. 1 and 2, and as discussed in detail below, the pipe 8 includes a series of perforations 10.

As best shown in FIG. 2, the pipe 8 includes two sections, a top section 9 and a bottom section 11. The top section 9 preferably has a diameter greater than the diameter of the well pump 18, as discussed below, and the bottom section 11 a diameter equal to or less than the diameter of the well pump 18. The bottom section 11 of the pipe is referred to as a "dip tube." During installation, the well pump 18 is lowered through the top section 9 and is latch connected with a watertight seal to the bottom section or dip tube 11, although other means of connection may also be used. Importantly, the well pump 18 sits below the water level 112. Preferably, the top section 9 has a diameter of approximately 4 inches and the dip tube 11 and well pump 18 have a diameter of approximately 3 inches, although other size pipe sections and well pumps may also be used depending on system requirements, ground and water conditions and levels, etc.

The submersible well pump 18 is a standard piece of equipment with several different model numbers of various capacities available. By way of example, a Grundfoss Model 22S2E07-160 with a capacity of 20 gallons per minute (GPM) at 170 ft of head, and a ¾ HP motor is used for the depth and pipe diameters shown in FIG. 2.

Figure 3:
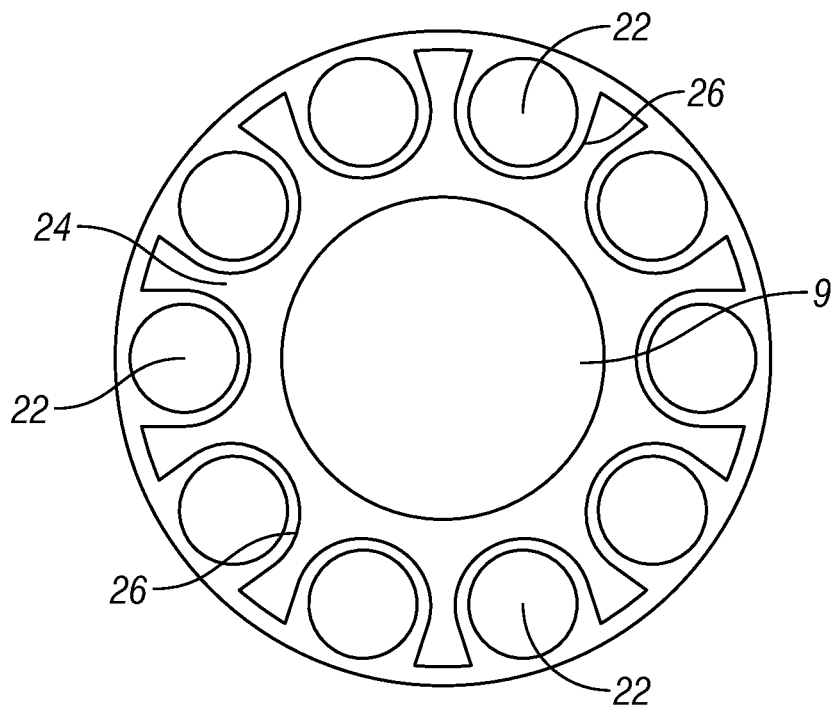
FIG. 3 is a cross-sectional view of the geothermal heat pump well taken along line A-A of FIG. 2.
Figure 4:
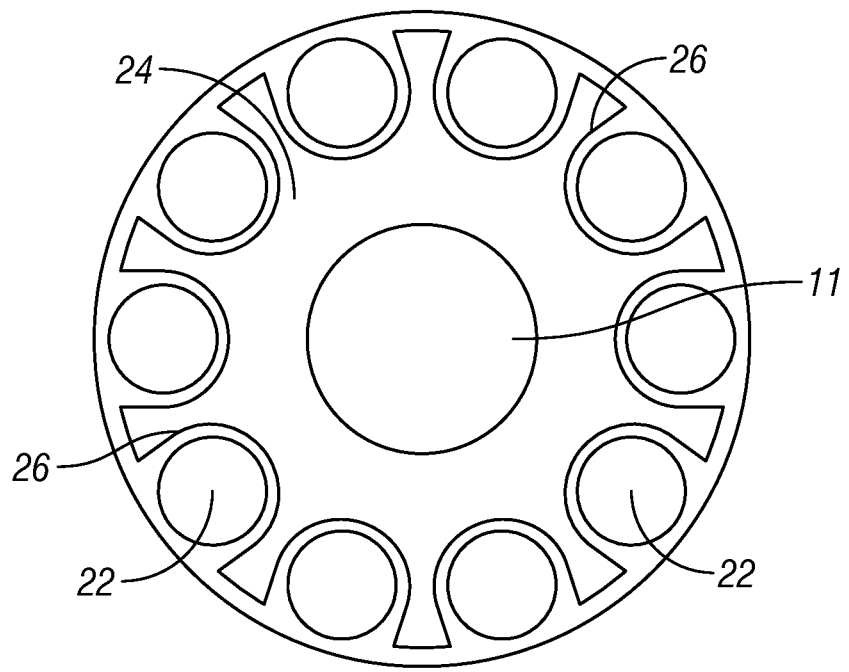
FIG. 4 is a cross-sectional view of the geothermal heat pump well taken along line B-B of FIG. 2.

FIGS. 3 and 4 show horizontal cross-sections of the top section 9 and bottom section 11, respectively, of the pipe 8.

As alluded to above, the perforations 10 in the pipe 8 are an important aspect of the present invention. The perforations 10 are distributed throughout the length of the pipe 8, however they are more densely distributed in a proportional manner towards the top and bottom ends of the pipe. In operation, the submersible well pump 18 pumps water up through the perforations 10 at the bottom of the pipe 8, substantially vertically through the length of the pipe 8, and out the perforations 10 at the top of the pipe 8. By pumping water up through the bottom perforations out the top perforations, the groundwater is moved across the closed loop heat pump piping 22, effecting convection, and thereby increasing the heat exchange process and, in turn, the efficiency of the system. As the pumped water exits the perforations 10 in the top of the pipe 8, it disperses laterally (radially) through fissures and the like in the ground before gradually making its way deeper into the ground into the intake perforations in the bottom of the pipe 8, thereby replenishing the water available for convection pumping.

The perforations 10 in the pipe 8 can be holes drilled into the PVC piping. In the embodiment shown in FIG. 2, 3/16" holes are drilled spirally starting at about 1 foot from the bottom of the dip tube 11 and 1 foot from the top of the top section 9 at the following intervals, as shown in Table 1:

TABLE 1

| Every 1" for the first 5 feet |
| Every 2" for the next 10 feet |
| Every 3" for the next 20 feet |
| Every 4" for the next 30 feet |
| Every 5" for the next 40 feet |
| Every 6" for the next 40 feet |
| Every 12" for the next 30 feet |

The perforations are preferably located along the section of pipe 8 such that the top section 9 is a mirror image of the bottom section 11. The spiral configuration noted above means that the holes are drilled such that those at different elevations will be angularly offset from the ones below and above. In the preferred embodiment, the holes are angularly offset by an angle of 36 degrees. This equates to about every 1.89" in circumference for the 3" diameter dip tube 11 and about every 2.5" in circumference for the 4" top section 9 shown in FIG. 2. While the above is a preferable perforation diameter and perforation layout for the embodiment shown in FIG. 2, other perforation diameters and layouts may also be used depending on the particular system requirements and ground conditions and constraints present.

Preferably, the perforation hole locations will correspond to the space between the high-density polyethylene (HDPE) piping 22 routing down the well along side the PVC center pipe 8, as discussed in detail below. The middle approximate 50 feet of the center pipe 8 will not have any, or will have very few holes, and the submersible well pump 18 will be located here. The top and bottom ends of the pipe 8 will be capped with top and bottom caps 13, 15 such that water is only allowed to ingress and egress through perforations 10. In the preferred embodiment, top cap 13 is removable, and in this regard it includes a flange and gasket to ensure a tight seal.

Referring to FIGS. 3 and 4, baffles 24 will be placed at approximately 50 foot intervals along the center pipe 8 on the outside thereof. The baffles are preferably formed of hard rubber and are slipped over the center pipe 8. As best shown in FIGS. 3 and 4, the baffles have grooves 26 to accommodate the HDPE source water piping 22. These baffles 26 will also act to block the flow of water down the well bore hole, forcing it out radially to the fissures in the adjacent earth or bedrock.

Referring back to FIG. 2, in use, lateral high-density polyethylene (HDPE) closed loop heat pump piping 12 is run from a structure, e.g., a building, into the manhole 4 where it is fed into a supply manifold 14. The supply manifold 14 routes fluid carried by the lateral supply piping 12 into another series of substantially vertical HDPE source water pipes 22 down into the well alongside the center pipe 8. At the bottom of the well the array of HDPE source water pipers 22 continue laterally for a short span and extend back up the well along the periphery of the center pipe 8 to a return manifold 16. A return pipe 17 then carries the water back to the building. In the building, the return HDPE piping would connect with the heat pumps as in any other conventional geothermal or water source heat pump system. At an approximate mid-point of the center pipe 8 is the submersible pump 18.

As shown in FIG. 2, five 1" diameter HDPE pipes 22 are employed, which would be able to carry at least 6 GPM each for a total flow rate of 30 GPM for the well system. It will be readily appreciated, however, that the diameter of the vertical HDPE pipes 22 can be varied according to the flow rate requirements of the system. In addition, the number of pipes 22 used in the well can also be varied in order to meet system requirements. Further, multiple wells in combination may also be used.

In operation, water is circulated in a closed loop manner from a building, in the manner described above, by the lateral source water pipe 12, supply manifold 14, and HDPE source water pipes 22, and back to the building by return manifold 16 and return pipe 17. During circulation of the fluid in the closed loop system, the submersible well pump 18 draws in groundwater from the perforations 10 in bottom pipe section 11 and pumps it up the center pipe 8 and out the perforations 10 in the top pipe section 9. As the water egresses, it trickles through fissures and the like back down, thereby effecting convection which facilitates heat exchange between the earth/groundwater and the water in the closed loop system. As a result of this circulation of groundwater and increased heat exchange, the efficiency of the entire system is increased.

The steps of constructing the convection enhanced closed loop geothermal heat pump well according to the present invention are described below. First, the well bore hole is drilled and the steel casing 19 is driven into the bedrock. A hole is then dug out for the manhole 4 and pea gravel is dumped in to line the bottom of the hole. A precast concrete manhole 4 may then be inserted into the hole, however, it will be readily appreciated that the manhole 4 may also be poured on site. Bore and sleeve holes are then cut in the manhole, or are precut, to accommodate the sleeve 19 and the HDPE source water connection piping 22. Perforation holes 10 are then drilled in the center pipe 8. It is expected that standard 20' lengths of PVC pipe will be used so the perforation holes should be planned and drilled in advance and each separate length of pipe will have a particular location in the chain of pipes. The bottommost length of pipe will be capped on the bottom. The pieces of PVC pipe are connected together as each is lowered into the well bore, preferably by solvent welding. The hard rubber baffles are also placed on the appropriate lengths of PVC piping before joining the pipe lengths.

Each of the HDPE source water piping lengths 22 are continuous and are inserted into the bore hole along side the center pipe 8. The source water pipes 22 are held in place by the baffle grooves 26. At the approximate midpoint of the PVC center pipe 8, a transition/latch connection and seal piece is provided for the dip tube 11 to top section 9 connection and for connection of the submersible pump to the dip tube 11. The submersible well pump 18 is then installed with a wiring connection for electrical power. Finally, the buried lateral HDPE source water piping is routed to and through pipe sleeves in the manhole 4 and connects to the respective manifolds 14, 16. The vertical HDPE piping is then also connected to the respective manifolds 14, 16. Once all of the piping, including the center pipe 8 and source water piping 22, is positioned in the bore hole and the submersible well pump 18 is installed with power wiring to the surface, the top of the center pipe 8 is capped with removable flanged and gasketed top cap 13.

Figure 5:
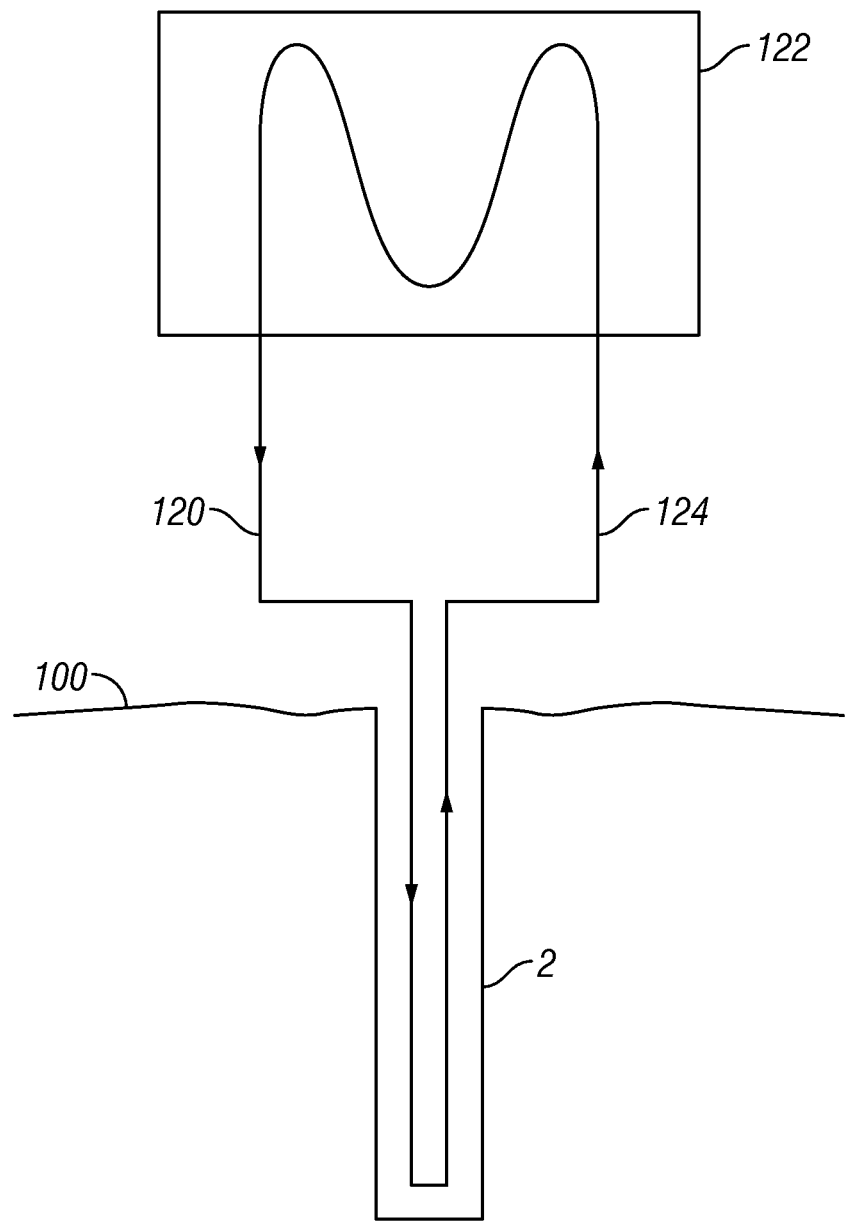
FIG. 5 is a schematic diagram of a ground source heat pump system in accordance with the present invention.

As shown schematically in FIG. 5, the convection enhanced closed loop geothermal well of the present invention may be used with a conventional water source heat pump, as known in the art, to provide heating during the winter and cooling during the summer. As shown therein, supply line 120 runs form heat pump 122 into the well 2 of the present invention, as described above, where heat transfer between the working fluid in the line 120 and the earth takes place. As with known systems, heat will be transferred to the earth in the summer and absorbed from the earth in the winter. A return line 124, in fluid communication with supply line 120 (in the preferred embodiment the supply line and return line are the same line) returns the working fluid to the heat pump 122 to provide heat or cooling to a facility. As will be readily appreciated, the heat pump 122 is of the type known in the art, and includes a compressor, condenser, evaporator and reversing valve for effecting the vapor-compression refrigeration cycle noted above.

Even though on a per well basis the inventive system may be more expensive than the classical closed loop pump, each well would have much more capacity, thus requiring fewer wells. The inventive well also has better heat transfer performance, with the earth returning fluid to the water source heat pumps that is closer to the approximate 60° F. temperature of ground water that will lower the lift of the heat pumps, thus improving their efficiency. With less wells the overall initial cost of the system will be reduced while its energy savings will increase.

Moreover, closed loop geothermal heat pump systems are more prevalent than open loop systems. Known closed loop systems, however, are less practical for larger projects, due the large number of wells required and the area those wells require. Due to this fact, the use of closed loop geothermal heat pumps is more common in single family residences and smaller commercial buildings. Many of these installations require only one or two wells. The novel features of the present invention, however, provide for increased capacity and efficiency as compared to known closed loop systems, thus making the present invention equally applicable and effective for larger commercial projects that would ordinarily require an open loop systems or an expansive and expensive conventional closed loop system.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A convection enhanced closed loop geothermal heat pump well, comprising:
   a well bore extending from an earth surface down into the earth, said well bore at least partially filled with groundwater;
   a center pipe having a top end and a bottom end disposed in said well bore, said center pipe having a plurality of apertures distributed throughout the length of said center pipe and being more densely distributed adjacent said top end and said bottom end of said center pipe for allowing the ingress and egress of said groundwater;
   a pump disposed within said center pipe for facilitating a flow of said groundwater through said apertures adjacent said bottom end of said center pipe and out of said apertures adjacent said top end of said pipe; and
   a closed source loop disposed in said well bore, said source loop including at least one source loop pipe extending adjacent said center pipe in said well bore and containing a working fluid for absorbing or transmitting thermal energy;
   wherein said apertures adjacent said top end of said center pipe are configured to disperse said groundwater flowing out of said apertures adjacent said top end of said center pipe radially away from said well bore and into said earth.

2. The geothermal heat pump well of claim 1, wherein said center pipe includes a top pipe section and a bottom pipe section, said top pipe section having a diameter greater than a diameter of said bottom pipe section.

3. The geothermal heat pump well of claim 1, wherein said at least one source pipe is five source pipes.

4. The geothermal heat pump well of claim 1, further comprising:
   at least one baffle oriented around an outer periphery of said center pipe for impeding a flow of said groundwater down said well bore and for facilitating a radial dispersion of said groundwater and to hold said at least one source loop pipe in place.

5. The geothermal heat pump well of claim 4, wherein said at least one baffle is a plurality of baffles positioned approximately every fifty feet along a length of said center pipe.

6. The geothermal heat pump well of claim 4, wherein said at least one baffle includes at least one groove for accommodating said at least one source pipe.

7. The geothermal heat pump well of claim 1, wherein said center pipe is capped at said bottom and said top end thereof.

8. The geothermal heat pump well of claim 1, further comprising:
   a steel casing encompassing an upper portion of said center pipe.

9. The geothermal heat pump well of claim 1, wherein said plurality of apertures are distributed in a spiral array along a periphery of said center pipe.

10. An energy transfer system for transferring energy between the earth and a facility, said system comprising:
    a wellbore extending from a surface of the earth down into the earth, said wellbore filled with groundwater up to a water level;
    a pump disposed in said wellbore, said pump drawing said groundwater from below said water level and pumping said water to a level above said water level for enhancing a circulation of groundwater;
    a center pipe having a top end and a bottom end disposed in said wellbore for directing a flow of said groundwater pumped by said pump, said center pipe having a plurality of apertures for permitting an entry and exit of said groundwater;
    at least one ground loop containing a moving fluid for transferring energy between said earth and said facility, said at least one ground loop including at least one loop pipe in fluid communication with said facility and extending into said wellbore to approximately a bottom of said wellbore and from said bottom of said wellbore back to said facility; and
    at least one baffle oriented around an outer periphery of said center pipe for impeding a flow of said groundwater down said well bore and for facilitating a radial dispersion of said groundwater;
    wherein said at least one ground loop is fluidly isolated from said groundwater;
    wherein said apertures are dispersed proportionately along each half of said center pipe to equalize a flow of said groundwater around said at least one loop pipe and being more densely concentrated adjacent said top end and said bottom end of said center pipe for facilitating said entry of said groundwater adjacent said bottom end, and said exit of said groundwater adjacent said top end; and
    wherein said apertures adjacent said top end are further configured to disperse said groundwater exiting of said apertures adjacent said top end of said center pipe radially away from said wellbore and into said earth surrounding said wellbore.

11. The energy transfer system of claim 10, wherein said center pipe includes a top pipe section and a bottom pipe section, said top pipe section having a diameter greater than a diameter of said bottom pipe section.

12. The energy transfer system of claim 10, wherein said plurality of apertures are distributed in a spiral array along a periphery of said center pipe.

* * * * *